SYSTEM FOR STORING CODED CHARACTER REPRESENTATIONS
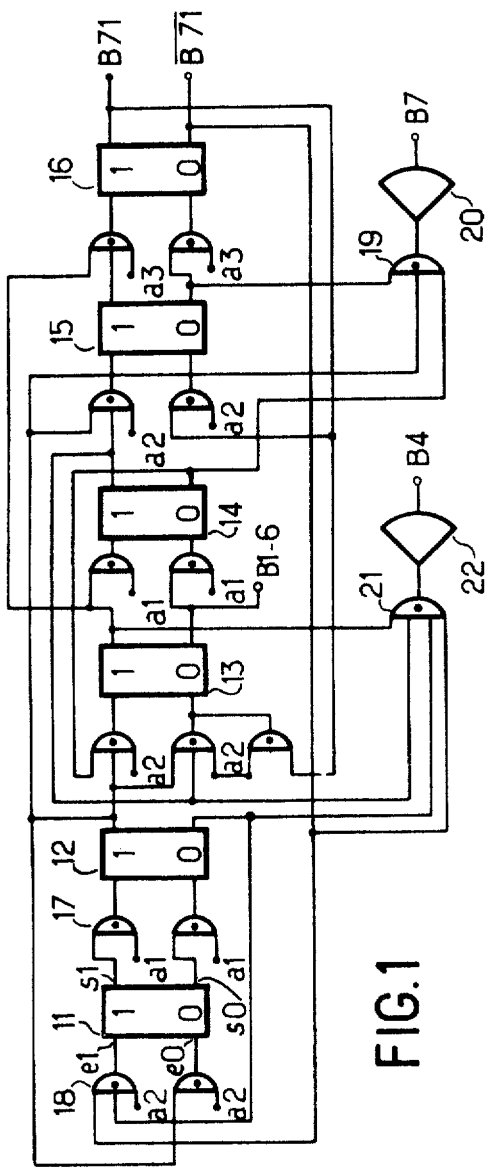
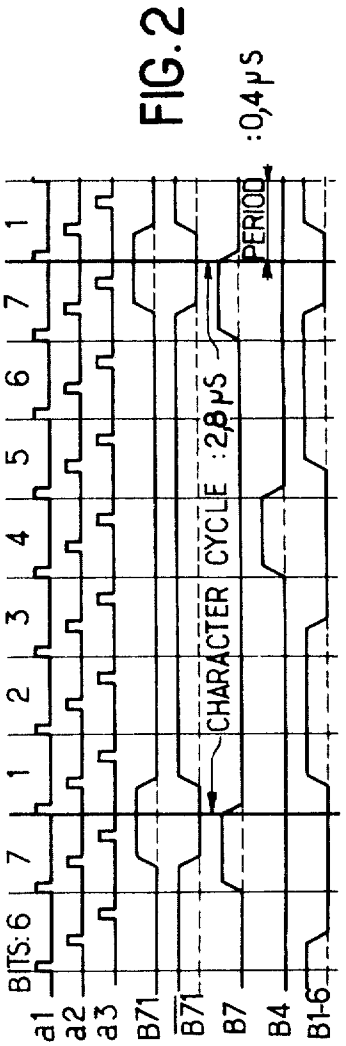
Inventors:
Francois Maurice Spire Fouré
and
David John Smithson
BY Baldwin Wight Diller & Brown
Attorneys

SYSTEM FOR STORING CODED CHARACTER REPRESENTATIONS

Inventors:
Francois Maurice Spire Fouré
and
David John Smithson
By Baldwin Wight Diller & Brown
Attorneys Inventors:
Francois Maurice Spire Fouré
and
David John Smithson
By Baldwin Wight Diller & Brown
Attorneys Inventors:
Francois Maurice Spire Foure
and
David John Smithson
BY Baldwin Wight Diller & Brown
Attorneys Inventors:
Francois Maurice Spire Fouré
and
David John Smithson
BY Baldwin Wight Diller & Brown
Attorneys Inventors:
Francois Maurice Spire Fouré
and
David John Smithson
By Baldwin Wight Diller & Brown
Attorneys Inventors:
Francois Maurice Spire Fouré
and
David John Smithson
BY Baldwin Wight Diller & Brown
Attorneys

United States Patent Office 3,430,211
Patented Feb. 25, 1969

3,430,211

SYSTEM FOR STORING CODED CHARACTER REPRESENTATIONS

Francois Maurice Spire Fouré, Paris, and David John Smithson, Marly-le-Roi, France, assignors to Societe Industrielle Bull-General Electric (Societe Anonyme), Paris, France Filed Feb. 27, 1967, Ser. No. 618,855
Claims priority, application France, Mar. 8, 1966, 52,548
U.S. Cl. 340—172.5 14 Claims
Int. Cl. G11b *13/00*

ABSTRACT OF THE DISCLOSURE

A data storage system cooperating with a data processor, for storing in a recirculating memory N character codes and also two interspersed index-codes useful in the reading-out of said memory. A control circuit arrangement associated with introduction counting means is operative to cause introduction in the memory of first and second special index-codes after a first number of character codes and after a second number of character codes are circulating respectively in said memory.

Figure 3:
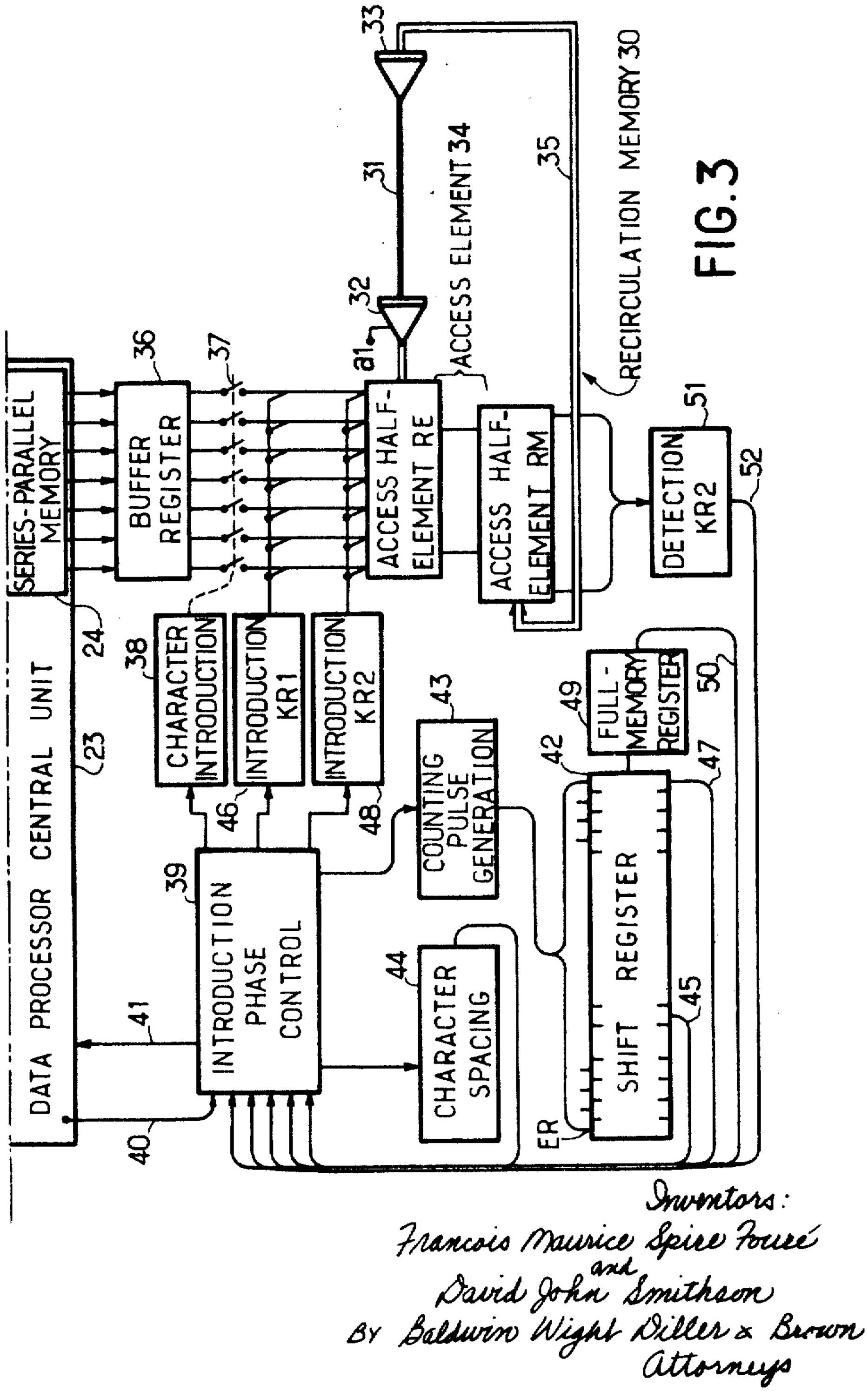

The present invention relates to a system for storing character representations which is adapted to co-operate with a character-printing machine, which constitutes an output element for an electronic data processor.

In the manner presently used, this data processor comprises a central control unit and has a high-speed memory operating in "shared time." This means that the said memory is sequentially accessible at a plurality of various devices under the control of priority circuits. Therefore, the data processor can successively supply codes of characters which have to be printed at intervals of time at least equal to a minimum number of memory cycles. Such a cycle may last, for example, 2 microseconds.

A first object of the invention is to provide a storage system having control means to enable it to store the character codes of a relatively large number of characters to be printed, which is of relatively low cost, due to the use, as storage device, of a memory of the purely "series" type, also called a "recirculation memory."

Since each character representation is transmitted in parallel, i.e. along as many conductors as there are bits in a character code, the storage system must be provided with means for effecting the parallel-to-series conversion of each character code. In known manner, each character code emanating from the said high-speed memory is first temporarily stored in a buffer register before being introduced into the recirculation memory. Thereafter, control means are adapted to govern the successive introduction of the characters into the "series" memory at intervals of time each equal to a fixed number of character cycles, the duration of such a cycle being the circulation time taken by the pulses of a character code to pass to a given point of the "series" memory.

In the course of the printing operations, on which it is unnecessary to dwell, it is arranged for two "reference" characters stored with the printing character codes in the "series" memory to perform an important function in the progress and the automatic interlinkage of the various functions. A printing control arrangement which may be incorporated in a printing system as mentioned above has been described in a patent application filed in the United States on Feb. 27, 1967, by the same applicants (Ser. No. 618,854).

Thus, another object of the invention is to provide a storage system provided with means capable of introducing into the recirculation memory at the desired instants a first and a second reference character, which reference characters may be distinguished from the printing codes (characters to be printed and "spaces"). It is by means of a process of counting the character codes introduced into the recirculation memory that the said means operate in order that the reference characters may occupy appropriate positions in relation to the printing character codes.

In accordance with the invention, therefore, there is provided a storage system co-operating with an electronic data processor which has a high-speed series-parallel memory, the latter being adapted to supply to it, one-by-one, a number of representations of characters to be printed, in order to store them in a recirculation memory, which has a recirculation cycle composed at least of N character cycles, this system comprising: a recirculation memory capable of dynamically storing N*t* coded character representations (with $Nt$=at least $N+2$) and including an access element whose transit time is equal to one character cycle; a buffer register connected to store temporarily a character representation emanating from the said high-speed memory; a shift register comprising at least N stages and in which an input stage is previously brought into a different state (for example the "1" state) from the other stages; pulse-generating means adapted to apply shift pulses to the stages of the shift register; a character spacing device having a counter whose counting base enables it to count a fixed number $n_1$ of character cycles, $n_1$ and N*t* being numbers which are prime to each other; and control means connected to become operative when a character code has been transferred into the said buffer register in order to control various switching circuits, as also the generating means for the purpose of producing: the introduction of this character code into the said access element, and the shift of the "1" state in the stages of the shift register, these control means also being controlled by the character spacing device so that two character codes successively introduced into the recirculation memory are separated by $n_1+1$ character positions.

In addition, there are provided a first and a second introduction control means which are arranged, in dependence upon the said control means and upon two particular stages of the shift register, to control the introduction into the said access element of a first index code and of a second index code respectively, after a first number X and after a second number N of printing character codes have been introduced into the recirculation memory.

Figure 4:
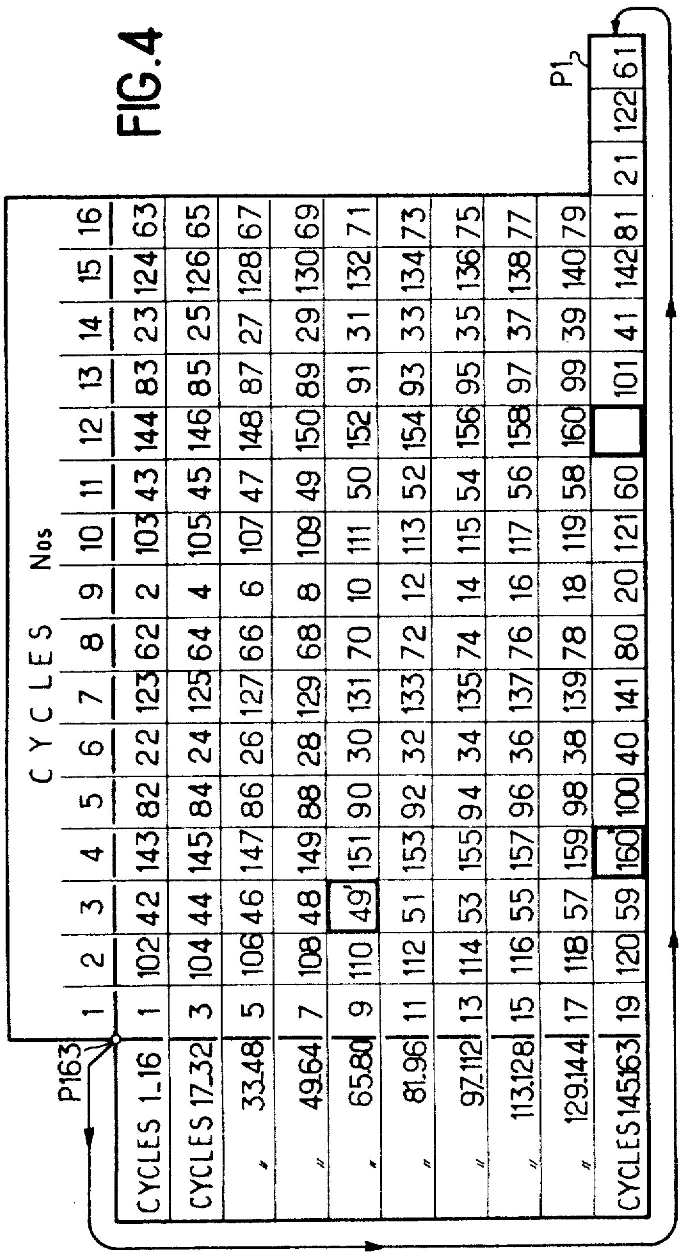
Figure 5:
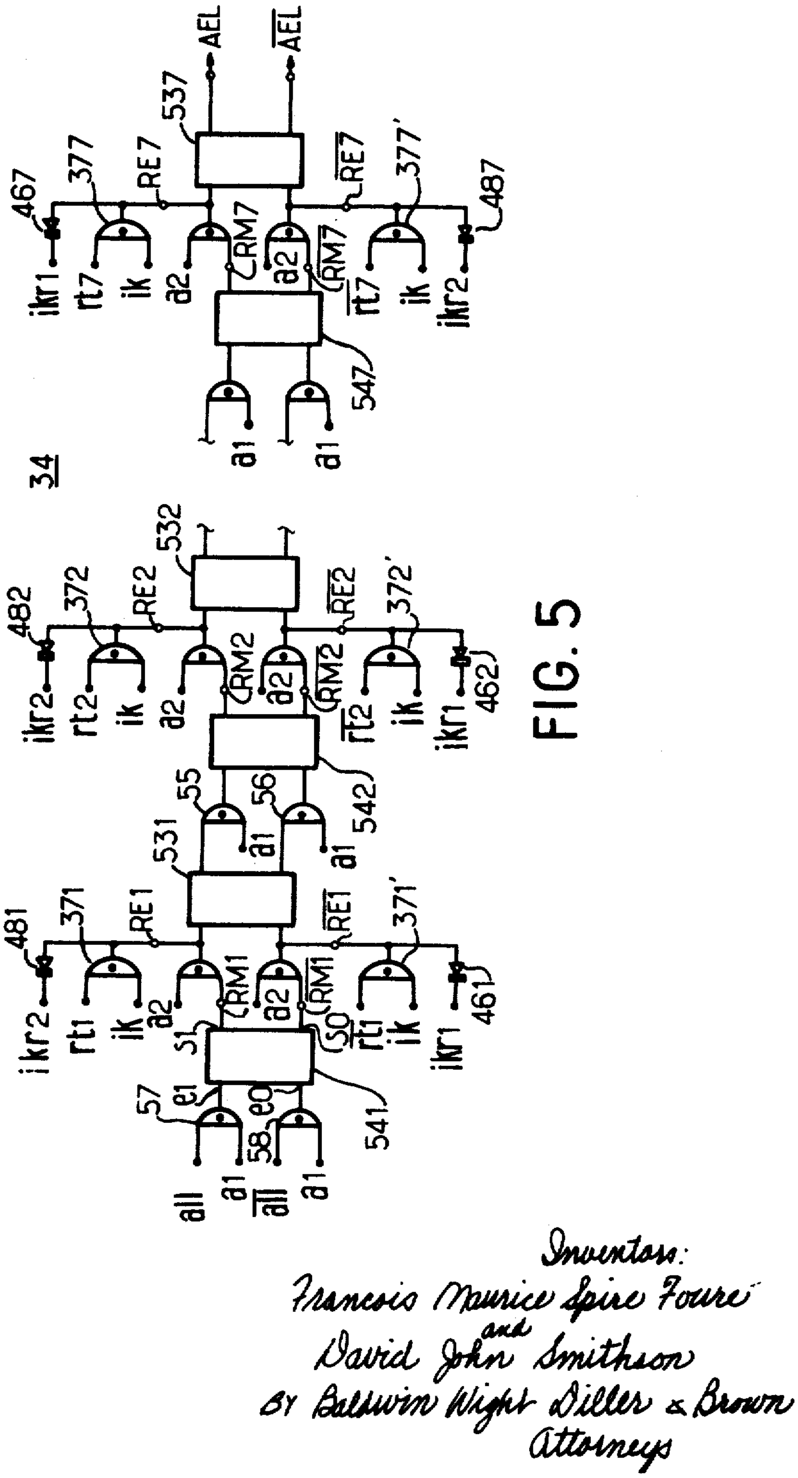
Figure 6:
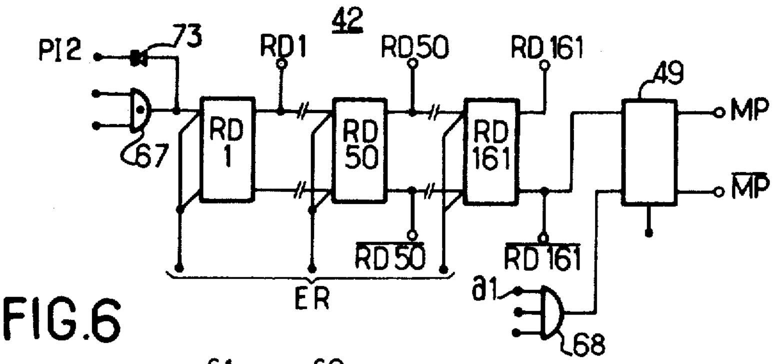
Figure 7:
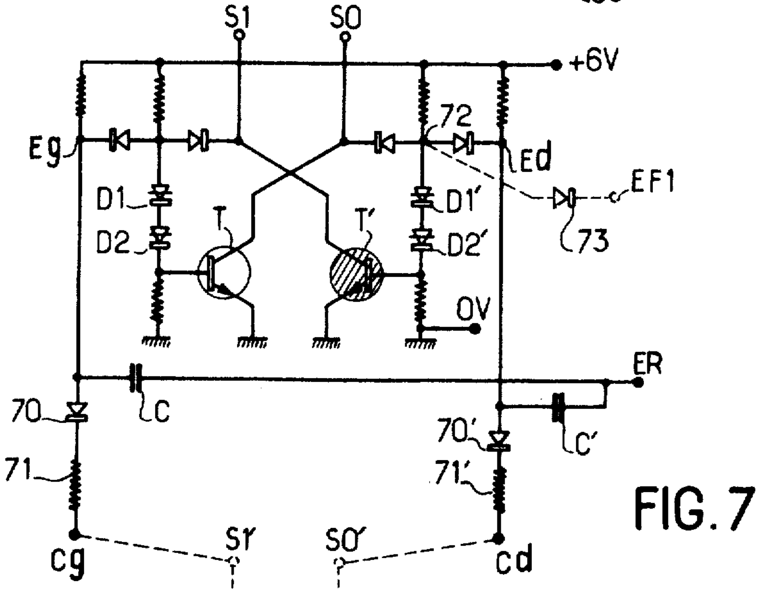
Figure 10:
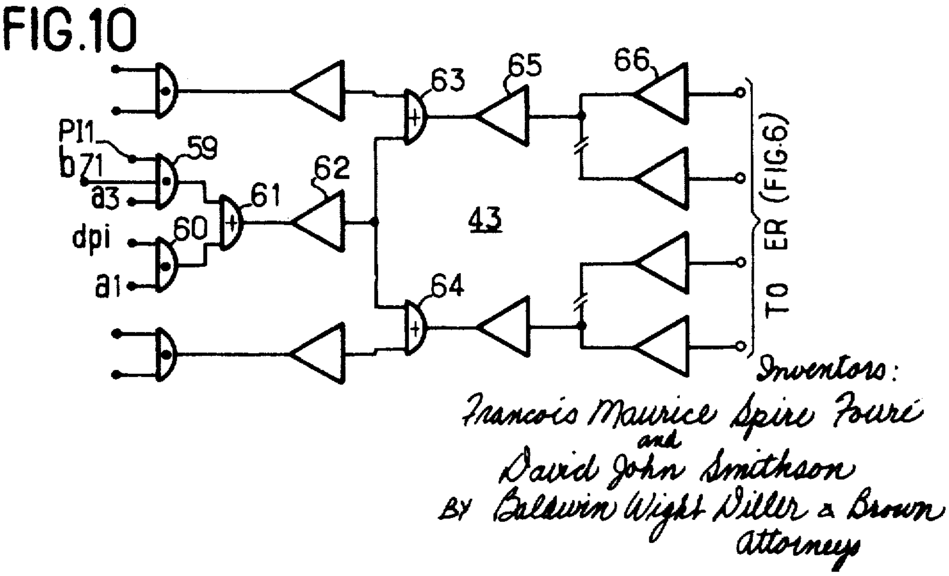
Figure 8:
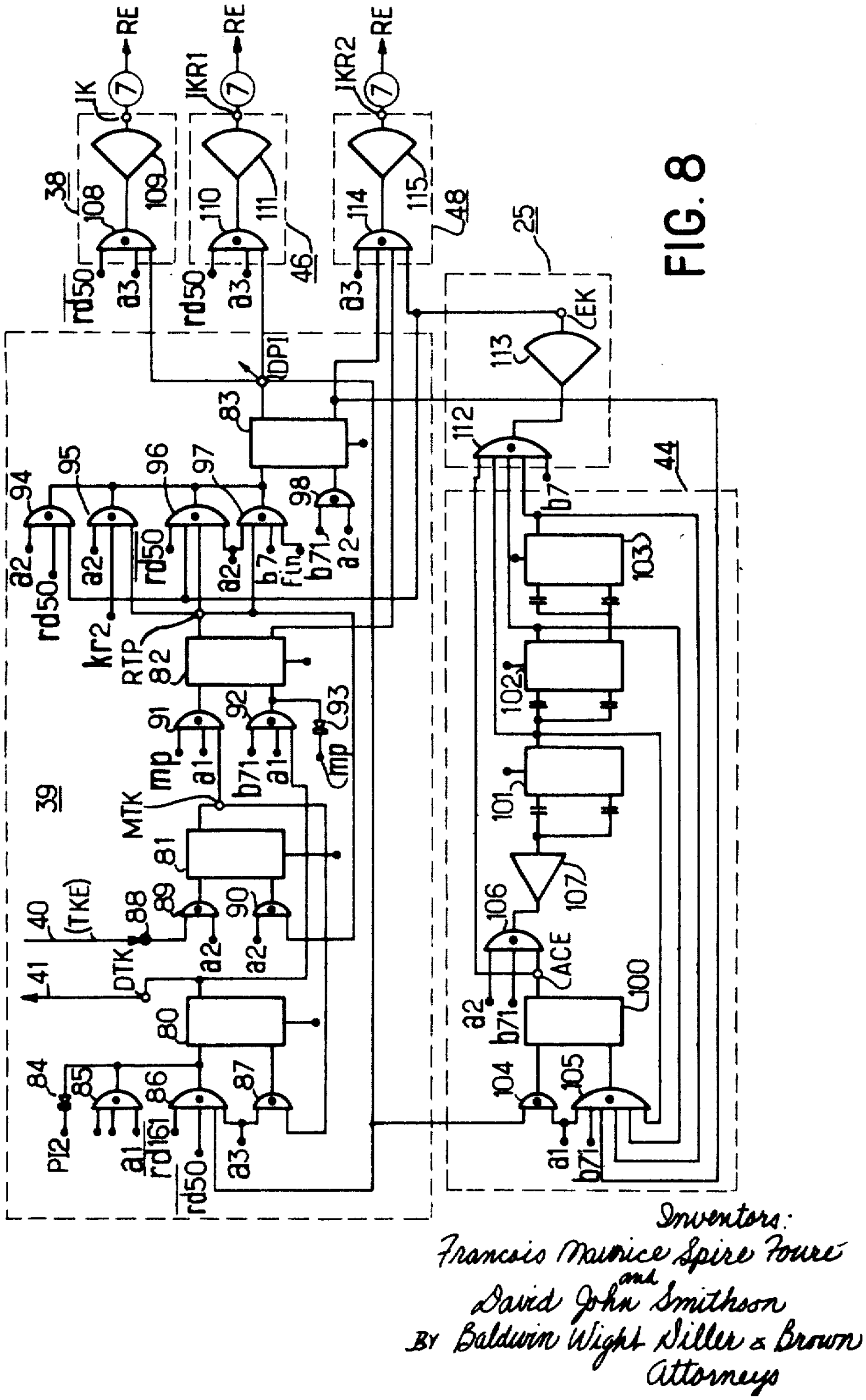
Figure 9:
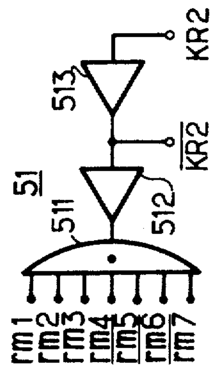
Figure 11:
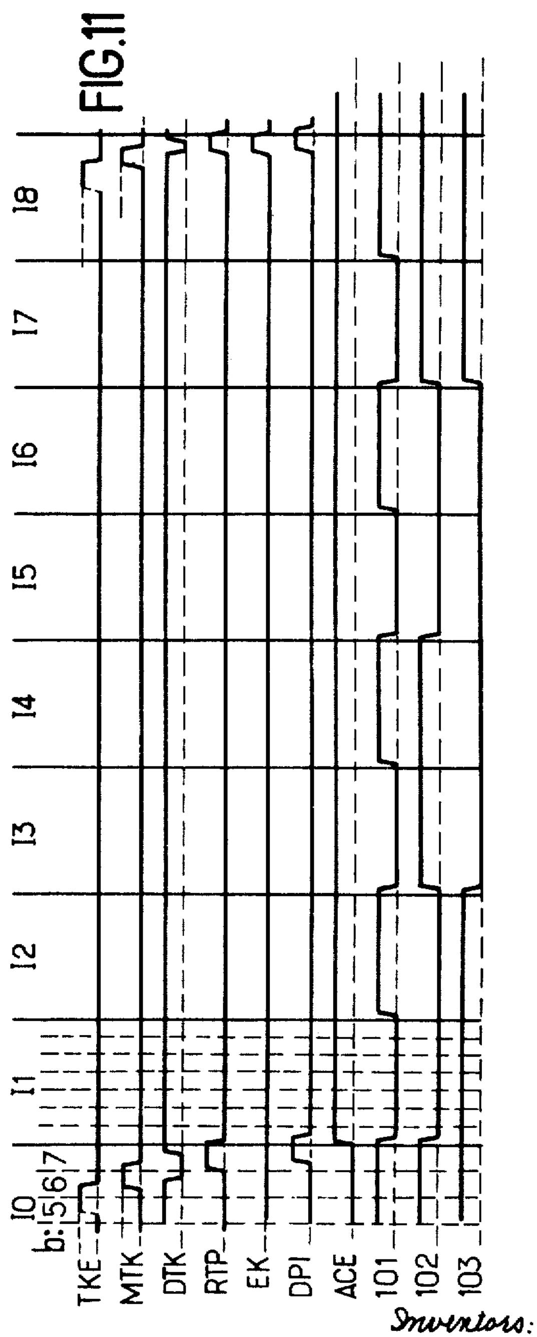

Further features of the invention, and the manner in which it is put into practice, will become more clearly apparent in the course of the following detailed description, and with the aid of the accompanying drawings, in which:

FIGURE 1 is a diagram of a clock-memory pulse generator associated with the storage system, FIGURE 2 is a time graph relative to the pulse generator, FIGURE 3 is a basic diagram of a storage system according to the invention, FIGURE 4 is a table explaining a possible arrangement of the character codes in the recirculation memory, FIGURE 5 is a logic diagram of an access element of this memory, FIGURE 6 is a simplified logic diagram of the shift register, FIGURE 7 is the circuit diagram of a stage of the shift register, FIGURE 8 is a logic diagram combining the introduction phase control device and the devices for the introduction of character codes and of the two index codes, FIGURE 9 is a logic diagram of an index-code detector, FIGURE 10 is a logic diagram of a shift pulse generating device, and FIGURE 11 is a time diagram explaining the general operation of the storage system.

It will be assumed that the data processor can transmit, from a high-speed magnetic-core memory, the character codes which are to constitute a line of printed characters in sequential manner, i.e. one-by-one, each time that it receives a transfer demand signal from the storage system, provided that this high-speed memory is not monopolised by an element having higher priority than the storage system co-operating with the printing machine.

There are provided 62 character types which may be printed, namely the letters of the alphabet, the digits and punctuation signs or various symbols. The coding of the characters when they are stored therefore involves seven binary positions or "bits," i.e. six binary positions for the weights 1, 2, 4, 8, 16 and 32 and one position for a parity bit, or rather an imparity bit. In fact, any printing character code must normally comprise an odd number of "ones." The "space" or blank code between characters is composed of a single "one" in the extreme right-hand position.

The storage system according to the invention has, among other advantages, the feature that it possesses a rhythm of operation which is independent of that of the data processor, and more particularly of the memory cycle of the high-speed memory, which may last two microseconds, for example.

This operating rhythm of the storage system is governed by a generator producing rhythm pulses, called "clock-memory pulses" by reason of the fact that their timing is adjusted in close relation to the recirculation cycle of the recirculation memory.

The clock-memory pulse generator will therefore be described with reference to FIGURES 1 and 2. It is composed of six bistable trigger circuits 11 to 16 interconnected by logic circuits. In accordance with a broadly accepted convention, such a trigger circuit is represented by a rectangle in FIGURE 1. It will be assumed that a trigger circuit, which is fairly often composed of two transistors, possesses two input terminals *e*1 and *e*0, and two output terminals *s*1 and *s*0. In one embodiment, when the trigger circuit is in the "0" state, a positive voltage, i.e. +3.5 volts, is available at the output *s*0, while the voltage is zero at the output *s*1. In this state, the trigger circuit may change to the "1" state only when a positive pulse is applied to its input *e*1. The voltage of +3.5 volts is then available at the output *s*1. In order that the trigger circuit may return to the "0" state, its input *e*0 must receive a positive pulse. In the course of the description, it will be assumed that the logic "1" is represented by the said positive voltage and that the logic "0" is represented by a zero voltage, at least in regard to an output *s*1.

The connections established by the various logic circuits, as shown in FIGURE 1, are such that the device somewhat resembles a pulse counter. Thus, it may be seen that an AND circuit such as 17 establishes a connection between the output *s*1 of one trigger circuit and the input *e*1 of the succeeding trigger circuit. The same is the case with the connection of an output *s*0 to the input *e*0 of the succeeding trigger circuit, except in regard to the trigger circuits 12 and 13 on the one hand and the trigger circuits 14 and 15 on the other hand.

The majority of the AND circuits, such as 17, have only two inputs and one output. The other AND circuits, such as 18, have three inputs. However, each of the AND circuits has at least one input which receives some of the rhythm pulses *a*1, *a*2 and *a*3, in the manner indicated by FIGURE 1. These pulses, which are shown by the graph of FIGURE 2, may be supplied by one or more appropriate generators, which have not been shown because they may be taken from any prior art. It is sufficient to specify that the pulses *a*1, *a*2 and *a*3 have in the present case an amplitude of 2 to 3 volts, a duration of about 60 nanoseconds, and a repetition frequency of 2.5 mc./s., and that their relative shift is one-third of a bit period, the latter having a duration of 0.4 microsecond.

In addition, there is provided an AND circuit 19 whose inputs are connected respectively to the output *s*1 of the trigger circuits 12 and to the outputs *s*0 of the trigger circuits 14 and 15. The output of the AND circuit 19 is connected to the input of the amplifier 20. The latter, which has here been symbolically represented by a circular sector, is a direct amplifier, i.e. a non-inverting amplifier. Such an amplifier is characterised by the fact that it supplies a positive pulse at its output when it receives a positive pulse at its input. As a result of the connections established, the output of the amplifier 20 supplies a train of pulses B7 whose repetition period is equivalent to seven bit periods, i.e. 2.8 microseconds, which defines a "character cycle," in accordance with the fact that a character representation is composed of seven bits.

Another AND circuit 21 possesses four inputs which are connected to the outputs *s*1 of the trigger circuits 13 and 14 and to the outputs *s*0 of the trigger circuits 12 and 16 respectively. The output of 21 acts on the input of the direct amplifier 22. The output of the latter supplies the train of pulses B4, whose repetition period is also equal to one character cycle. While a pulse B7 defines the seventh bit period *b*7, a pulse B4 defines the fourth bit period *b*4.

The pulses B71 and $\overline{\text{B71}}$ are available at the outputs *s*1 and *s*0 of the trigger circuit 16 respectively, while the pulses B1–6 are available at the output *s*0 of the trigger circuit 13. The pulses B1–6 extend from the second third of the period *b*1 to the first third of the period *b*3, and from the second third of the period *b*5 to the first third of the period *b*7, inclusive.

The aforesaid clock-memory pulses are constantly emitted as soon as voltage is applied to the storage system.

FIGURE 3 shows the basic diagram of the storage system. A storage device capable of storing the characters of one printing line is shown in the form of a recirculation memory 30. The latter is composed essentially of a delay line 31 of any appropriate type. However, in a preferred embodiment, this delay line is of the torsional magnetostriction type, which affords the advantage that it has low sensitivity to temperature variations and which is of economical construction.

The element 32 symbolises a number of members, namely: a logic circuit receiving the rhythm pulses *a*1, a writing amplifier and a transducer capable of imparting torsional stress waves to the nickel wire of the delay line. The element 33 also symbolises a number of members such as an output transducer and a reading amplifier supplying the pulses representing the character codes circulating along the delay line. The length of the latter is such that the transit time between the two transducers corresponds to 162 previously defined character cycles.

The circulation loop also comprises an additional element or access element 34. This is a shift register of known type, composed of seven stages, each of which comprises two bistable trigger circuits. The access element 34 may therefore be regarded as composed of two interconnected access half-elements RE and RM. The output of the half-element RE acts on the input of the element 32, and the loop is completed by the bifilar connection 35 between the output of the element 33 and the input of the half-element RM. The transit time of the access element 34 is equal to one character cycle, which brings the total circulation time of the loop to 163 character cycles.

There is provided a buffer register 36 of a commonly employed type. It may be composed of seven bistable trigger circuits, each having two inputs and two outputs. It is connected by seven channels to the output circuits of a series-parallel memory 24 forming part of the data processor 23. It is unnecessary to describe this buffer register in detail. It is sufficient to specify that when it receives a fresh character code, the one which was previously stored therein is automatically erased.

A set of switches 37 is provided which, when closed, permit of introducing a character code into the access half-element RE from the buffer register 36. These switches are under the control of the character introduction device 38, which itself is under the control of the introduction phase control device 39. The latter receives through a link 40 a signal from the central unit of the data processor 23 each time a character code is transferred into the buffer register 36. Immediately after this, and also prior to the beginning of any character introduction, the device 39 sends a character transfer demand signal to the central unit through the link 41.

A shift register 42 is employed as counter to count the number of character codes introduced into the recirculation memory 30. It is composed of 161 similar stages. Each stage comprises an input such as ER which is intended to receive shift pulses, which may be regarded as being pulses to be counted. These pulses, which are applied in parallel, emanate from a counting pulse generating device 43, which is controlled by the introduction phase control device 39. The latter also co-operates with a character spacing device 44, due to which a character code can normally be introduced into the memory 30 only once per introduction phase, the duration of which is eight character cycles, i.e. 22.4 microseconds. It will hereinafter be indicated how all the stages of the register 42 are initially brought to the "0" state, except the first left-hand stage, which is brought to the "1" state. At each introduction of a character code into the memory 30, this "1" state advances by one stage towards the right.

A link 45, extending from an output of a particular stage of the shift register 42, permits of informing the control device 39 that a first number of character codes has been introduced. In the succeeding introduction phase, the device 39 will prevent the action of the character-introducing device 38, but will control the reference character introducing device 46 in such manner that it effects the introduction into the half-element RE of a first index code representing a reference character KR1. The normal introduction of the character codes is thereafter resumed as before.

A link 47 extending from another stage, in this instance the last stage of the register 42, permits of informing the device 39 that the total number of character codes provided for, i.e. 160, has just been introduced into the memory 30. Therefore, at a last introduction phase, the device 39 causes the device 49 to introduce into the half-element RE a second index code representing the reference character KR2.

A register 49, called the "full-memory" register, is connected to an output of the last stage of the shift register 42. When this stage returns to the "0" state, the register 49 records the fact that the memory 30 contains 160 character codes plus the reference character KR1, and this, due to the connection 50, is signalled to the device 39, which controls the introduction of the reference character KR2, as indicated in the foregoing.

It may happen that a character-introducing operation cannot be performed without interruption. This is manifested by the fact that, at the instant when a character code should be introduced into the memory 30, the buffer register 36 has not received a fresh character code. The introduction phase control device 39 is informed of this and immediately causes the introduction device 48 to introduce a replacement character code, i.e. the reference character KR2.

The storage system must wait until the content of the memory 30 has performed one complete loop lap before a further introduction phase is initiated. When this replacement character code passes through the access half-element RM, a detecting device 51 detects the reference character KR2 and, through the link 52, informs the device 39 thereof. The latter then initiates a fresh introduction phase, provided that a fresh character code has been transferred into the buffer register 36. Otherwise, the content of the memory 30 continues to recirculate.

It will be assumed that the recirculation memory 30 is completely empty before a character introduction operation commences. FIGURE 4 will serve to explain how the character codes, representing the characters to be printed, will be located in the memory 30 when the latter is completely full. For the sake of brevity, there will be employed in the following the term character instead of the corresponding character code. In the present case, it will be assumed that the characters are transferred from the data processor in the order of their printing positions, i.e. first the first character (to the extreme right of the printing line), then the second, and so on up to the 160th character.

It will be seen on reference to FIGURE 4 that the characters are not stored in the memory 30 in the intended order of the characters in the pirnted line. The numbers 1 to 16 appearing at the top of the columns of the table and the six lines marked "Cycles 1–16 . . . , cycles 145–163" show in compact form the interspersing of the characters. Assuming that the introduction operations are uninterrupted, the first character (marked 1 in the upper left-hand square compartment) would be introduced in the course of a first character cycle, the second character (2) in the course of the 9th cycle, the third in the course of the 17th cycle and so on. It will be observed that, since only 20 characters are introduced per loop lap, a little more than 8 loop laps will be required to fill the memory 30 completely if no interruption occurs.

If it is considered that the table of FIGURE 4 is valid from the space viewpoint, the storage position P1, in the bottom right-hand corner, would correspond to the access element 34 of FIGURE 3, and the point marked P163 in the top left-hand corner would correspond to the element 33. It is as if the characters zigzagged from right to left and from the bottom upwards in FIGURE 4. The compartments marked 49′ and 160′ represent respectively the locations of the first index code KR1 and of the second index code KR2. The latter occupy the relative positions illustrated, simply by reason of the interspersing of the character codes. The essential condition is that they divide the whole of the character codes into two equal parts. In addition, the second reference character must be introduced only after the 160th printing character code. A blank compartment in the last line of the table corresponds to an empty position, which is necessary for effecting the shifting of the data in the course of phases whose duration is normally of eight character cycles.

One very important point is to be noted, namely that the interspersing of the character codes as illustrated is in no way essential. If the data processor has a different mode of transfer, there would be nothing to prevent the characters from being arranged in the memory 30 in their normal printing order. The only requirements to be observed in the choice of the positions of the index codes are those indicated in the foregoing.

It will be seen from FIGURE 4 that if, at a given instant called the reference instant, the first character (1) is on the point of leaving the position P163, the first reference character KR1 is situated in the 67th storage position, marked 49′, and the second reference character KR2 is situated in the 148th storage position, marked 160′.

FIGURE 5 shows in somewhat more detailed form the structure of the access element 34. The latter is essentially composed of 7 bistable trigger circuits 531 to 537 (only three being shown) forming the access half-element RE, and of 7 bistable trigger circuits 541 to 547, forming the access half-element RM. In well-known manner, two AND circuits such as 55 and 56 establish the connection between the outputs of one trigger circuit and the inputs of the succeeding trigger circuit. The AND circuits connected to the inputs of the trigger circuits 541, 547 have an input which receives the rhythm pulses *a*1. The AND circuits connected to the inputs of the trigger circuits 531–537 have an input which receives the rhythm pulses *a*2. The mode of operation of the shift register thus formed is therefore "biphase." The input AND circuits 57 and 58 have an input terminal to receive the outputs *all* and $\overline{all}$ respectively of the delay-line reading amplifier. This means that it is the wires 35 (FIGURE 3) which lead thereto. The outputs of the trigger circuit 537 are connected to the inputs (AEL and $\overline{\text{AEL}}$) of the delay-line writing amplifier.

Access in parallel to any circulating character code is possible at the outputs marked RM1 to RM7 and $\overline{\text{RM1}}$ to $\overline{\text{RM7}}$.

The switches 37 (FIGURE 3) are in fact composed of two sets of 7 AND circuits. The respective outputs of the 7 AND circuits 371 to 377 are connected to the inputs RE1 to RE7. The respective outputs of the 7 AND circuits 371′ to 377′ are connected to the inputs $\overline{\text{RE1}}$ to $\overline{\text{RE7}}$. An input (*rt*1 to *rt*7) of each of the AND circuits 371–377 is connected to the output *s*1 of a corresponding trigger circuit of the buffer register 36. An input ($\overline{rt1}$ to $\overline{rt7}$) of each of the AND circuits 371′ to 377′ is connected to the output *s*0 of a corresponding trigger circuit of the buffer register 36. Each of the other inputs of these AND circuits is connected to the output IK of the device 38 (FIGURE 8). When this output supplies a positive pulse, a character code may be transferred from the buffer register 36 and introduced into the half-element RE.

Since the 63 code combinations are utilised for the printing characters, it has been necessary to choose two further codes, with an even number of "ones" for the index codes KR1 to KR2, namely 0001111 for KR1 and 1111000 for KR2. The reference characters may be introduced through simplified input circuits comprising diodes which take account of the above codes. A first set of diodes is composed of 7 diodes 461–467 partly shown in FIGURE 5, which are connected to certain inputs of the half-element RE. The diodes 461 to 463 are connected at their anode to the inputs $\overline{\text{RE1}}$ to $\overline{\text{RE3}}$ respectively, and the diodes 464 to 467 are connected to the inputs RE4 to RE7 respectively. Their cathodes are connected together at the output IKR1 of the device 46 (FIGURE 8). When this output supplies a positive pulse, the index code KR1 is introduced into the half-element RE.

In the second set of diodes 481 to 487, the diodes 481 to 484 are connected at their anodes o the inputs RE1 to RE4 respectively and the diodes 485 to 487 are connected to the inputs $\overline{\text{RE5}}$ to $\overline{\text{RE7}}$ respectively. Their cathodes are connected together at the output IKR2 of the device 48 (FIGURE 8). When this output supplies a positive pulse, the index code KR2 is introduced into the half-element RE.

FIGURE 6 shows in the form of a logic diagram, the shift register 42, composed of 161 stages numbered RD1 to RD161. The outputs *s*1 of these stages correspond to the output terminals, of which only the outputs RD1, RD50 and RD161 have been shown. Two other outputs $\overline{\text{RD50}}$ and $\overline{\text{RD161}}$ are employed for the requirements of the previously mentioned control. The shift register comprises 161 stages in order that it may be able to count a like number of introductions, namely those of 160 printing codes and that of the first index code KR1.

FIGURE 7 shows the structure of any stage of a shift register 42. It is essentially a question of a symmetrical bistable trigger circuit associated with two input control circuits. This trigger circuit comprises two transistors T, T′ of the NPN type, associated with diodes and resistors in know manner. It is to be noted that, in each branch, the two series-connected diodes D1, D2 are silicon diodes capable of storing a given quantity of electricity and having, in the forward conducting direction, a threshold voltage of about 0.7 volt. The other diodes are germanium diodes for high-speed switching. The output terminals S1 and S0 are connected to the collectors of the transistors T′ and T respectively.

An input control circuit comprises a diode 70 in series with a resistor 71 as also a capacitor C. One plate of the capacitors C and C′ is connected to the input shift rhythm terminal ER. The junction point of the diode 70 and of the capacitor C is connected to the input E*g*. The control inputs C*g* and C*d* are connected to the terminals S1′ and S0′ respectively, which may be the outputs of the trigger circuit of the preceding stage.

It will be assumed that in the stage RD under consideration the trigger circuit is in the "0" state, i.e. that T and T′ are non-conductive and conductive respectively. The voltage at S1 is substantially zero, while the voltage at S0 is about +3.5 volts. In the absence of a shift pulse, the terminal ER is at +3.5 volts. In dependence upon the control voltages previously received by the inputs C*g* and C*d*, there can only be one of the capacitors C and C′ which is charged at the instant when a negative shift pulse is applied to the input ER. It is only in the case where the preceding stage RD′ is in the "1" state that the shift pulse is transmitted to the input ED, and that it is then capable of changing the stage RD to the "1" state. Conversely, if the trigger circuit RD is initially in the "1" state, the preceding stage is necessarily in the "0" state, and the shift pulse has the effect of returning the stage RD to "0" and of bringing the succeeding stage to "1".

By way of exception, the trigger circuit of the stage RD1 comprises an input EF1, called the "forcing-to-1" input, which is connected by a diode 73 to the junction point 72. Owing to this arrangement, a pluse of negative polarity applied to EF1 can change this trigger circuit to the "1" state.

The structure of the shift register 42 is therefore such that it operates in accordance with the so-called "monophase" mode. It will be seen from FIGURE 6 that the output $\overline{\text{RD161}}$ is connected to the input *e*1 of a trigger circuit which is nothing other than the device 49 (FIGURE 3), or the "full-memory" register, the outputs MP and $\overline{\text{MP}}$ of which supply a control voltage. Prior to any character introduction, this trigger circuit is returned to "0".

The introduction phase control device 39 will now be considered with reference to FIGURE 8. This device is composed essentially of the trigger circuits 80 to 83 and AND circuits receiving rhythm and clock-memory pulses, and establishing interconnections as shown. Their functions will be described in the following.

The trigger circuit 80 has the function of generating a "character transfer demand" pulse when it changes to the "1" state, which pulse is transmitted from its output DTK through the conductor 41 to the central unit of the data processor. It will be noted that the inputs of the AND circuit 86 are connected to the outputs $\overline{\text{RD50}}$ and $\overline{\text{RD161}}$ of the corresponding stages of the shift register 42, which means that these inputs receive an authorising voltage except when one of the stages RD50 and RD161 is in the "1" state. The trigger circuit 81 has the function of temporarily memorising, when set to "1," the transfer of a character code into the buffer register 36, since at the instant of this transfer the central unit sends an indicating pulse TKE, which is transmitted through the conductor 40 to the terminal 88. Since this pulse lasts longer than one bit period, the AND circuit 89 passes at any instant *a*2 a pulse which brings the trigger circuit 81 to "1."

The trigger circuit 82 has the object of registering the fact that a fresh character code is present in the buffer register. By reason of the AND circuit 91, the trigger circuit 82 can change to the "1" state only if the trigger circuit 81 is itself at "1" and if the signal MP is positive, which means that the memory 30 is authorized to receive at least one character code.

The trigger circuit 83 has the object of effecting, when it changes to the "1" state, the initiation of a character introduction phase. It is the AND circuits 94 to 97 which bring about its change to "1," as will hereinafter be explained. A negative introduction phase normally comprises: the transfer of a character code from the buffer register 36 to the half-element RE, the dispatch of a shift pulse to the inputs of the register 42, and the counting of eight character cycles for effecting the correct spacing of the successively introduced characters.

The character spacing device 44 is also visible in FIGURE 8. It is composed essentially of a trigger circuit 100 whose function is to authorise, when it changes to the "1" state, the start of the counting of the character cycles, and of a pulse counter comprising three stages 101, 102 and 103. It is to be noted that each of the latter should preferably have the same structure as each of the stages of the shift register 42, such as that described with reference to FIGURE 7. When the trigger circuit 100 is in the "1" state, the rhythm pulses *b*71, *a*2 received by the AND circuit 106 and inverted by the inverting amplifier 107 are applied to the inputs of the stage 101 of the counter. The symbolic representation adopted for the amplifier 107 is that of an inverting amplifier, that is to say, it supplies a zero voltage at its output if its input receives a positive voltage, for example +3.5 volts, and vice versa. The change of the trigger circuit 100 to "1" is effected by the positive pulse appearing at the output DPI of the trigger circuit 83 and applied to an input of the AND circuit 104.

The return to "0" of the trigger circuit 100 may be produced after a period of eight character cycles by the AND circuit 105, the autohrising conditions of which are: "1" state of the stages 101 to 103, and "0" state of the trigger circuit 83. The latter condition corresponds to the case where a fresh introduction phase cannot be initiated immediately after the preceding one.

The character introduction device 38 is composed of an AND circuit 108 followed by a direct amplifier 109. The AND circuit 108 can transmit in each instance the pulse appearing at the output DPI of the trigger circuit 83, only when the stage RD50 of the shift register 42 is not in the "1" state.

The device 46 for the introduction of the reference character KR1 is composed of an AND circuit 110 followed by a direct amplifier 111. The pulse appearing at the terminal DPI is transmitted through the AND circuit 110 only when the stage RD50 of 42 is in the "1" state.

An auxiliary control device 25 is composed of the AND circuit 112 followed by the direct amplifier 113. The conditions of the conductive state of the AND circuit 112 are that the trigger circuit 100 and the stages 101 to 103 are in the "1" state. It will be seen that the output EK of 113 controls one input of each of the AND circuits 94 and 96.

The device 48 for the introduction of the reference character KR2 is composed of the AND circuit 114 followed by the direct amplifier 115. The conditions of the conductive state of the AND circuit 114 are: "0" state of the trigger circuits 82 and 83, and positive voltage supplied by the device 25, signifying "correct character spacing."

FIGURE 9 illustrates the device denoted by 51 for detecting the reference character KR2. This device is composed of an AND circuit 511 having seven inputs, and of two inverting amplifiers 512 and 513, the whole being connected in cascade. In accordance with the previously defined index code KR2, four inputs of the AND circuit 511 are connected to the outputs RM1 to RM4 respectively, and the other three inputs are connected to the outputs $\overline{RM5}$ to $\overline{RM7}$ of the access half-element RM. It is only when the corresponding combination is detected that a positive voltage appears at the output KR2.

The generating device 43 intended to generate the shift pulses serving for the character counting will be seen in FIGURE 10. It is composed of two AND circuits 59, 60, of an OR circuit 61, of an inverting amplifier 62, of two OR circuits 63, 64 and of a number of inverting amplifiers. It is to be noted that 61 is an OR circuit for positive pulses, while 63 and 64 are OR circuits for pulses of negative polarity. The output of each of the OR circuits 63, 64 controls the input of an inverting amplifier such as 65, the output of which is connected to the inputs of a number of inverting amplifiers such as 66. The output terminals of the latter are connected to the 161 shift inputs ER (FIGURE 6) of the shift register 42, to which they supply pulses of negative polarity. The number of amplifiers 66 is in inverse proportion of the gain of each amplifier, that is to say, it depends upon the number of inputs that the latter can supply with shift pulses.

Since the AND circuit 60 has one input connected to the output DPI (FIGURE 8), it is this AND circuit which normally produces the emission of a shift pulse at the beginning of each character introduction phase. Two AND circuits and two inverting amplifiers (not referenced), which operate only if the same device is also employed in the printing operations, must be disregarded. For further details regarding these operations, the patent application filed on the same day as the present application by the applicants, for: "Arrangement for Controlling the Registration of Alphanumerical Characters" could be consulted.

It is to be noted that the devices not shown may be operative immediately voltage is applied to the storage system for bringing certain trigger circuits into predetermined states. Thus, where one input is shown below the rectangle of a trigger circuit, this means that this trigger circuit is previously returned to the "0" state, which is generally the case. On the other hand, when an input is shown above the rectangle of a trigger circuit, this means that this trigger circuit is previously brought into the "1" state. This is the case only with the trigger circuits 101 to 103 of the counter of FIGURE 8.

The general operation of the storage system will now be considered with reference to FIGURE 11. However, it is to be noted first of all that certain devices which are not shown are provided to carry out certain preparatory operations. Thus, one of them generates a pulse PI1 after voltage has been applied to the system. This pulse, which has a minimum duration of 0.5 millisecond, and which ensures the positioning of the trigger circuits in general at 0 or at 1, as indicated above, is also applied to an input of the AND circuit 59, FIGURE 10. Consequently, repeated shift pulses will produce the erasure of any prior content of the shift register 42.

Another pulse PI2 is thereafter generated with a negative polarity and a minimum duration of 80 nanoseconds. This pulse is received by the "forcing-to-one" input of the stage RD1 (FIGURE 6) through the diode 73, which causes this stage to change to "1." On the other other hand, this pulse is also received by the trigger circuit 80 (FIGURE 8) through the diode 94. This results in the change of the trigger circuit 80 to "1," and consequently a character transfer demand pulse is transmitted to the central unit of the data processor.

The reception of a control signal at two non-referenced inputs of the AND circuit 85 after the end of a printing operation also has the effect of producing the emission of a transfer demand pulse. This same control signal is also applied in this case to the inputs of the AND circuit 67 (FIGURE 6) in order to change RD1 to "1," as also the inputs of the AND circuit 68 in order to bring the register 49 to the "0" state. It would also be possible to perform these preliminary operations under the control of manual control means, for example from a control desk.

The storage system is now ready to operate normally. It will be assumed that a "character transfer effected" pulse TKE has arrived at the terminal 88 (FIGURE 8) in the course of a character cycle I0, and that it ends at the earliest after the middle of the bit period *b5*. As already stated, this pulse accompanies the transfer of a character code in the buffer register 36. The AND circuit 89 then causes the trigger circuit 81 to change to "1," the output voltage of the said trigger circuit being represented by the line MTK (character transfer memorisation). The change of the trigger circuit 81 to "1" may equally well occur earlier if the pulse TKE is advanced in the compass of the character cycle.

With the trigger circuit 81 in the "1" state, the result of this is that the trigger circuit 80 is returned to "0" through the AND circuit 87 at the succeeding instant *b6.a3* (line DTK, FIGURE 11). The abbreviated designation *b6.a3* denotes an instant defined by a rhythm pulse *a3* during a bit period *b6*. Since at this instant the output $\overline{MP}$ of the register 49 is positive, the AND circuit 91 brings the trigger circuit 82 to "1" at the succeeding instant *b7.a1*, which means that the buffer register contains a character code to be introduced.

At the succeeding instant *b7.a2*, since 82 is at "1," the AND circuit 90 brings the trigger circuit 81 to "0". On the other hand, the AND circuit 97 has an input which receives a positive "end" voltage through a device (not shown) which indicates the end of a printing operation, even during the initial application of voltage. Therefore, the AND circuit 97 brings the trigger circuit 83 to "1" (line DPI, FIGURE 11) also at the instant *b7.a2*. This results in the accomplishment of four separate functions. First of all, at the succeeding instant *b7.a3*:

(1) The AND circuit 86 is conductive and brings the trigger circuit 80 to "1," which trigger circuit generates a further character transfer demand pulse;

(2) A pulse is transmitted through the AND circuit 108 (FIGURE 8), which results in the introduction of the first character code into the half-element RE of the memory 30.

Thereafter, at the instant *b1.a1* of the succeeding cycle I1, the AND circuit 60 (FIGURE 10) is conductive so as to cause a shift pulse to be applied to the inputs ER of the shift register 42. Consequently, the "1" state of the stage RD1 is now transferred to the succeeding stage RD2.

Finally, also at the instant *b1.a1*, the AND circuit 104 (FIGURE 8) brings the trigger circuit 100 to "1" to authorise the space counting (line ACE, FIGURE 11). In addition, at the same instant, the AND circuit 92, one input of which receives the output of the trigger circuit 80, returns the trigger circuit 82 to "0."

At the succeeding instant *b1.a2*, the AND circuit 98 systematically returns the trigger circuit 83 to "0." From this instant, rhythm pulses *a2* will be applied through the AND circuit 106 and the inverting amplifier 107 to the counter 101–103. First of all, the stage 101 changes to "0." The negative pulse which is thus set up at its output *s1* also brings the stage 102 to "0." At the beginning of the cycle 12, the stage 101 returns to "1," but the positive pulse which is set up at its output *s1* has no effect on the stage 102. At the beginning of the cycle I3, the stage 101 returns to "0" and the stage 102 returns to "1." The negative pulse which is set up at the output *s0* of the latter brings the stage 103 to "0." Examination of the graph shows that during the succeeding cycles I4 to I8, the state of the stage 101 changes in every cycle, the state of the stage 102 in every two cycles and the state of the stage 103 in every four cycles. Finally, the stages 101 to 103 have taken up their initial "1" state at the beginning of the cycle I8.

Assuming that, as a result of normal operation, a further character code has meanwhile been transferred into the buffer register, a further pulse TKE has returned the trigger circuit 81 to "1" before the end of the period *b6* of the cycle I8. Therefore, the events which have affected the trigger circuits 80, 82, 83 are repeated as described above. However, it may be noted that from the first introduction phase the output EK of the device 25 (FIGURE 8) supplies a positive voltage during the period *b7* of the cycle I8. In addition, it is now the AND circuit 96 which causes the trigger circuit 83 to change to "1." Moreover, at the instant *b1.a1* of the succeeding cycle, the AND circuit 105 cannot cause the trigger circuit 100 to change back to "0," since at this instant the output *s0* of the trigger 83 supplies a zero voltage.

Thus, the introduction phases automatically succeed one another as long as a further character code is present in the buffer register at the end of each introduction phase.

When the 49th character code has been introduced into the memory 30, it is now the stage RD50 of the register 42 which is in the "1" state during the 49th introduction phase. The end of the latter will follow a different course.

The AND circuits 86 and 108 are then rendered non-conductive by their input $\overline{rd50}$, which prevents the emission of a transfer demand pulse by 80 and the introduction of a character code through the device 38. Although the trigger circuits 81 and 82 are probably at "1", the AND circuit 96 is also non-conductive, but since the ouput EK supplies a positive voltage in the period *b7*, the AND circuit 94 brings the trigger circuit 83 to "1" at the instant *b7.a2*. Therefore, at the succeeding instant *b7.a3*, since the AND circuit 110 is conductive, the device 46 causes the index code KR1 to be introduced into the half-element RE, which is accompanied by the shift of the "1" in the shift register 42.

The sequence of the events is not changed. Since later, in the course of the 50th introduction phase, it is the stage RD51 of the register 42 which is at "1," this enables the character-code introduction operations to resume their normal sequence.

These operations thus proceed in accordance with the previously mentioned condition. It will be observed that during the 160th introduction phase it is the stage RD161 of 42 which is in the "1" state and that the 160th printing character code must yet be introduced into the memory 30. It is necessary to prevent the emission of a further transfer demand pulse. The AND circuit 86 is blocked for this purpose at the instant *b7.a3* of a cycle I8. In addition, there is nothing to prevent the AND circuit 108 from authorising the introduction of the 160th printing character into the memory 30, and the 161st introduction phase commences. At the beginning of the latter, a further pulse returns the stage RD161 of 42 to "0." The positive pulse $\overline{RD161}$ available at its output *s0* brings the trigger circuit 49 to "1," indicating "memory full." In practice, the second index code KR2 still remains to be introduced.

It will be seen from FIGURE 8 that a diode 93 is connected between the input *e0* of the trigger circuit 82 and the output MP of the register 49. Therefore, in the course of this introduction phase, the trigger circuit 82 can no longer change to "1." Consequently, none of the AND circuits 94 to 97 can be conductive at the end of the cycle I8, under consideration and hence the trigger circuit 83 cannot be brought to "1."

However, the output EK of 25 supplies its positive voltage in the period *b7*. The AND circuit 114 is conductive owing to the fact that is receives the outputs *s0* of the trigger circuits 82 and 83. This has the result that, at the succeeding instant *b7.a3*, the index code KR2 is introduced into the half-element RE. At the succeeding instant *b1.a1*, the AND circuits 104 and 105 are non-conductive and conductive respectively, so that the trigger circuit 100 is brought to "0" and the counting of the character cycles is interrupted.

This terminates the operation for the introduction of the character codes into the recirculation memory 30, which are disposed as indicated in FIGURE 4, for a given reference instant.

In the somewhat rare case where a fresh printing character code has not been transferred into the buffer register 36, the device 39 has not received a pulse TKE in the course of an introduction phase, and by virtue of this fact the trigger circuits 81, 82 and 83 are in the "0" state at the end of this phase. Substantially the same conditions exist as at the end of the 161st introduction phase seen above. Since a positive voltage is available at the output EK of 25, the AND circuit 114 is conductive at the instant *b*7.*a*3 and the device 48 causes the index code KR2 to be introduced into the half-element RE, the said index code thus being stored in the memory 30 in the place which would have been occupied by the expected character code. It is clear that no shift pulse is applied to the register 42 and that the counting of the character cycles is interrupted since the trigger circuit 100 is returned to "0."

As the content of the memory 30 continues to circulate, 163 character cycles, i.e. 456.4 microseconds, are required to complete one lap of the loop. At the end of this period, when the reference character KR2 passes through the half-element RM, the detector 51 detects it and supplies at its output KR2 a pulse in the period *b*7 of a last character cycle, this pulse being capable of authorising the AND circuit 95. However, if a fresh character code has not meanwhile been transfered into the buffer register, the trigger circuits 81 to 83 have remained in the "0" state and none of the devices 36, 46 and 48 can be operative. The content of the memory 30 commences another recirculation cycle.

On the other hand, if a fresh character code is present in the buffer register, the trigger circuits 81 and then 82 and 83 are changed to the "1" state and the introduction of the fresh character code is effected by the device 38 in the normal way. The index code KR2 is automatically erased merely by reason of the fact that the fresh character code is introduced. Thereafter, the introduction phases can resume their normal sequence provided that the succeeding character codes are regularly transferred.

Owing to the organisation just described, the storage system may possess an operating rhythm whose synchronism requirements are solely dependent upon the recirculation time of the memory intended for the storage of the characters to be printed. This operating rhythm is to a large extent independent of that of the associated data processor. It has been seen that the storage system is provided with means to enable it to receive character codes, either at a regular, but not absolutely synchronised rate, or at any intervals of time, the minimum duration of which is fixed by the storage system itself.

It is obvious that the number of N characters of a printing line, and therefore the total capacity of the recirculation store, are in no way limited to the values referred to by way of example. However, the numbers N*t* and *ni*, representing, in numbers of character cycles, the circulation time of the recirculation memory and the duration of an introduction phase respectively, cannot be chosen at random. The numbers N*t* and *ni* must be prime to one another. For example, with $N=160$ characters and 2 reference characters, it has not been possible to choose $Nt=162$ at the same time as $ni=8$ because 162 and 8 are not prime to one another. It has been necessary to adopt $Nt=163$. In another possible example, it would be possible to choose $Nt=142$ with $ni=7$, i.e. without having to add an excess storage position which finally remains empty, as explained in the description.

The constructional details which have been described are only to be regarded as non-limiting examples, because it is obvious that modifications to the structure of certain devices are within the scope of the person skilled in the art.

More particularly, it would be possible with the aid of very simple means to prevent the application of the shift pulses to the shift register 42 at the time of the introduction of the first reference character KR1. The number of stages of the shift register could then be brought to 160.

We claim:

1. A data storage system cooperating with a data processor having a high speed memory, which can supply one at a time at spaced time intervals a number N of character coded representations to be stored, this system comprising in combination:

- a recirculating memory (30) coordinated to timing means and arranged so that its circulation time duration be equal to N*t* character cycle times, N*t* being equal at least to $N+2$, this memory including an access element (34) serially connected but parallely accessible,
- a buffer register (36) for temporarily storing each character transferred from said processor,
- counting means (42) including at least N stages, of the type wherein only one stage can be active at a time,
- a control circuit arrangement (39) composed of logical circuits adapted, when a character code has been transferred into said register, to initiate an introduction phase, and having other logical circuits connected to two predetermined stages of said counting means,
- a character spacing device (44) cooperating with said control arrangement to limit the duration of an introduction phase to a fixed number *ni* of character cycles, *ni* and N*t* being prime numbers to each other,
- pulse generator means (43) adapted to apply an advancing pulse to said counting means upon initiation of an introduction phase by said control arrangement,
- a character introduction device (38, 37) operative under control of said control arrangement to insert a character code from said buffer register in the access element of said memory, and
- two index-code introduction devices (46, 48) operative under control of said control arrangement to insert a first index-code and a second index-code in the access element of said memory after a first number of character codes and after a second number of character codes are circulating in said memory respectively.

2. A data storage system as claimed in claim 1, wherein said access element (34) is constituted by as many stages as there are bits in a character code, said stages comprising each two bistable circuits, and being connected and operated to form a shift register whose circulation time is equal to one character cycle.

3. A data storage system as claimed in claim 1, wherein said counting means (42) is in the form of a shift register having $N+1$ bistable stages, the outputs of two predetermined stages controlling said other logical circuits in said control arrangement (39) in a manner such that said second index-code (KR2) is inserted into said access element when said first index-code (KR1) and N character codes are circulating in said memory (30).

4. A data storage system as claimed in claim 3, wherein said control circuit arrangement (39) comprises a first bistable circuit (81) set into an operative condition when a character code is stored in said buffer register, a second bistable circuit (83) which may be set into an operative condition through a first AND circuit connected to said first bistable circuit, and wherein said character introduction device (38) comprises an AND circuit (108) jointly controlled by a first output of said second bistable circuit (83) and by a second output of one of said predetermined stages (RD 50) of rank $X+1$ of said shift register for authorising the sequential introduction into said memory (30) until X character codes are circulating therein.

5. A data storage system as claimed in claim 4, wherein a logical circuit (110) of a first of said index-code introduction devices (46) is jointly controlled by a first output of said second bistable circuit (83) and by a first output of said stage (RD 50) of rank $X+1$, to cause the entry of said first index-code (KR1) when said stage is in a "1" storage condition.

6. A data storage system as claimed in claim 5, wherein a logical circuit (114) of a second of said index-code introduction devices (48) is connected to be authorised by said first and second bistable circuits (81, 83) when they both are in an inoperative condition and to receive a pulse emitted at the end of an introduction phase by said spacing device (44, 25) for causing the entry of said second index-code (KR2) into said access element after said number N of character codes are circulating in said memory.

7. A data storage system cooperating with a data processor having a high speed memory, which can supply one at a time at irregularly spaced time intervals, a number N of character coded representations to be stored, this system comprising in combination:

a recirculating memory (30) coordinated to timing means and arranged so that its circulation time duration be equal to N*t* character cycle times, N*t* being at least equal to $N+2$, this memory including an access element (34) serially connected by parallelly accessible, a buffer register (36) for temporarily storing each character code transferred from said processor, a shift register (42) having $N+1$ stages and used as a pulse counter in which a first ordered stage is previously set to a "1" condition, a control circuit arrangement (39) composed of logical circuits, adapted to initiate an introduction phase on the condition that a character code is being stored in said buffer register, and having logical circuits connected to two predetermined stages of said shift register, a character spacing device (44) coordinated to said timing means to count a fixed number *ni* of character cycles, *ni* and N*t* being prime numbers to each other, reciprocal logic connections interconnecting said control arrangement (39) and said spacing device (44) in such a manner that any introduction phase initiated has a duration of *ni* character cycles, pulse generator means (43) adapted to apply an advancing pulse to said shift register upon initiation of any introduction phase and a character introduction device (38, 37) operative under control of said control arrangement to insert a character code into said access element at the outset of an initiated introduction phase on the condition that such a character code has been transferred into said buffer register, during the preceding introduction phase.

8. A data storage system as claimed in claim 7, further including two index-code introduction devices (46, 48) operative under control of said control arrangement (39) to insert a first index-code and a second index-code in the said access element (34) after a first number of character coder codes and after a second number of character codes respectively are circulating in said memory (30).

9. A data storage system as claimed in claim 8, wherein said shift register (42) has two stages the outputs of which control said other logical circuits in said control arrangement (39) in a manner such that said second index-code (KR2) is inserted into said access element when said first index-code (KR1) and N character codes are circulating in said memory (30).

10. A data storage system as claimed in claim 9, wherein said control circuit arrangement (39) comprises a first bistable circuit (81) set into an operative condition when a character code is stored in said buffer register, a second bistable circuit (83) which may be set into an operative condition through a first AND circuit connected to said first bistable circuit, and wherein said character introduction device (38) comprises an AND circuit (108) jointly controlled by a first output of said second bistable circuit (83) and by a second output of one of said predetermined stages (RD50) of rank $X+1$ of said shift register for authorising the sequential introduction into said memory (30) until X character codes are circulating therein.

11. A data storage system as claimed in claim 10, wherein a logical circuit (110) of a first of said index-code introduction devices (46) is jointly controlled by a first output of said second bistable circuit (83) and by a first output of said stage (RD50) of rank $X+1$ to cause the entry of said first index-code (KR1) when said stage is in a "1" storage condition.

12. A data storage system as claimed in claim 11, wherein a logical circuit (114) of a second of said index-code introduction devices (48) is connected to be authorised by said first and second bistable circuits (81, 83) when they both are in an inoperative condition and to receive a pulse emitted at the end of an introduction phase by said spacing device (44, 25) for causing the entry of said second index-code (KR2) into said access element after said number N of character codes are circulating in said memory.

13. A data storage system as claimed in claim 11, wherein by logical connections, said second bistable circuit (83) remains in an inoperative condition if said first bistable circuit (81) is itself in an inoperatve condtion at the end of an introduction phase as a result of a new character code not being stored in said buffer register, and wherein a logical circuit (114) of a second of said index-code introduction devices (48) is controlled jointly by second outputs of said first and second bistable circuits and by said spacing device (44, 25) for causing the entry of said second index-code (KR2) into said access element in place of a waited character code.

14. A data storage system as claimed in claim 13, which comprises a detector circuit (51) to detect said second index-code (KR2) when passing through said access element (34), and connected to said second bistable circuit (83) through a logical circuit (95) whereby, when said second index-code is detected after a complete memory circulation time, said control arrangement (39) may initiate a new introduction phase.

References Cited

UNITED STATES PATENTS

| | | | |
|---|---|---|---|
| 3,107,344 | 10/1963 | Baker et al. | 340—173 |
| 3,308,440 | 3/1967 | Truitt et al. | 340—172.5 |
| 3,351,917 | 11/1967 | Shimabukuro | 340—172.5 |
| 3,368,028 | 2/1968 | Windels et al. | 340—172.5 |
| 3,377,622 | 4/1968 | Burch et al. | 340—172.5 |

PAUL J. HENON, *Primary Examiner.*

J. P. VANDENBURG, *Assistant Examiner.*

U.S. Cl. X.R.

340—173